Dec. 16, 1952     T. G. HUTCHENS     2,622,186

DOMESTIC AUTOCLAVE

Filed Nov. 2, 1948     2 SHEETS—SHEET 1

Inventor:
Theodore G. Hutchens
by his Attorneys
Howson & Howson

Dec. 16, 1952     T. G. HUTCHENS     2,622,186
DOMESTIC AUTOCLAVE
Filed Nov. 2, 1948     2 SHEETS—SHEET 2
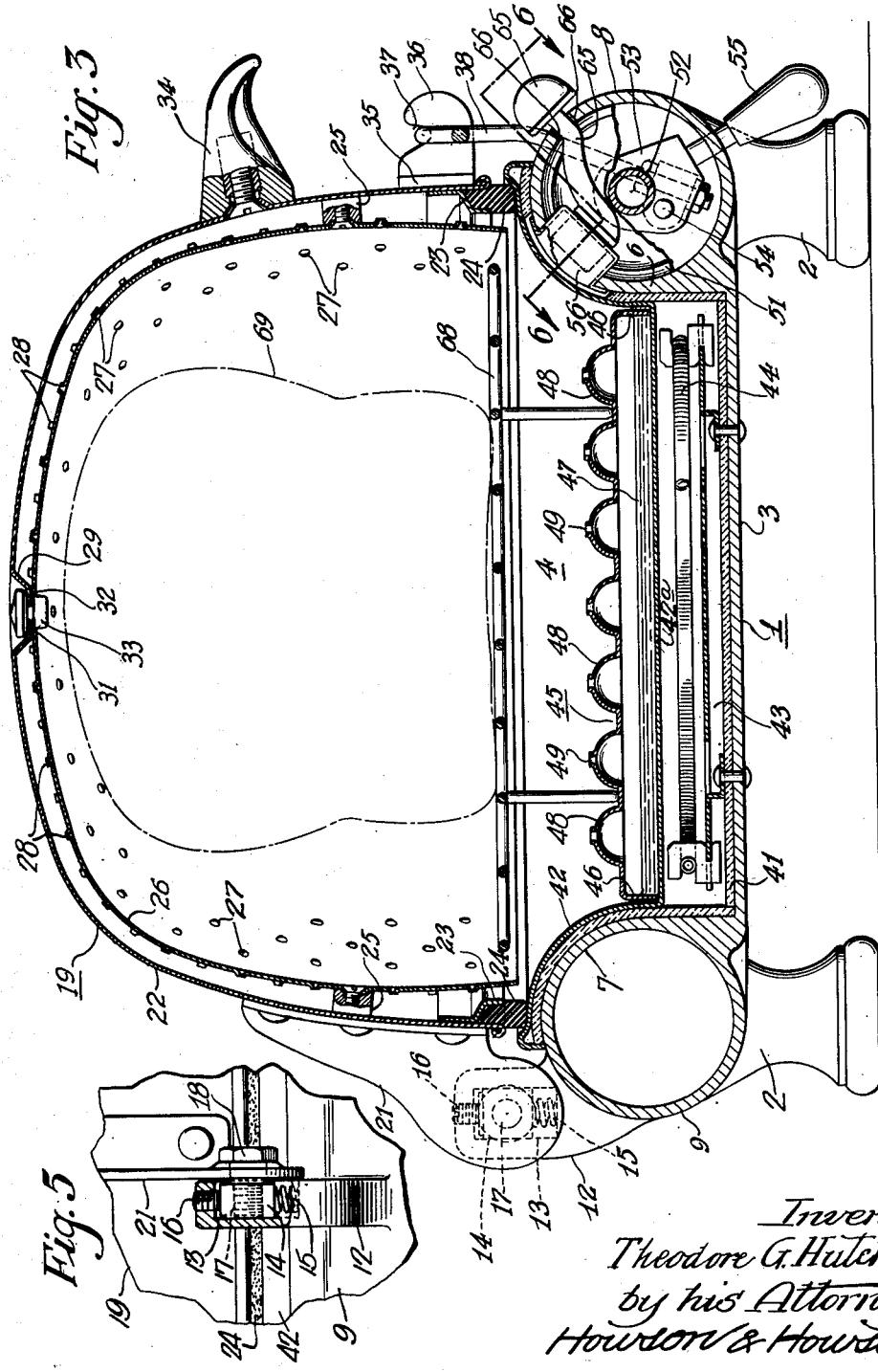
Inventor:
Theodore G. Hutchens
by his Attorneys
Howson & Howson

Patented Dec. 16, 1952

2,622,186

UNITED STATES PATENT OFFICE 2,622,186

DOMESTIC AUTOCLAVE

Theodore G. Hutchens, Wichita, Kans.

Application November 2, 1948, Serial No. 57,995

4 Claims. (Cl. 219—43)

The primary object of this invention is to provide a type of autoclave adapted primarily for domestic uses. The device may be used, for example, for revitalizing stale foods such as bread from which the normal moisture content has escaped, for cooking and sterilizing purposes, and for use generally where steam or autoclaving treatments may be required.

More specifically, an object of the invention is to provide a relatively inexpensive receptacle having a sealable chamber with steam or vapor generating means, and having also various structural elements and devices hereinafter specifically described for substantially precluding contact between the articles under treatment and the treating liquid except in the vapor phase of the latter.

The invention resides further in other structural details and arrangements hereinafter described and illustrated in the attached drawings wherein:

Fig. 3 is a sectional view on the line 3—3, Fig. 1;

Fig. 5 is a fragmentary rear elevational view showing details of the adjustable hinge for the cover member of the unit.

Figure 1:
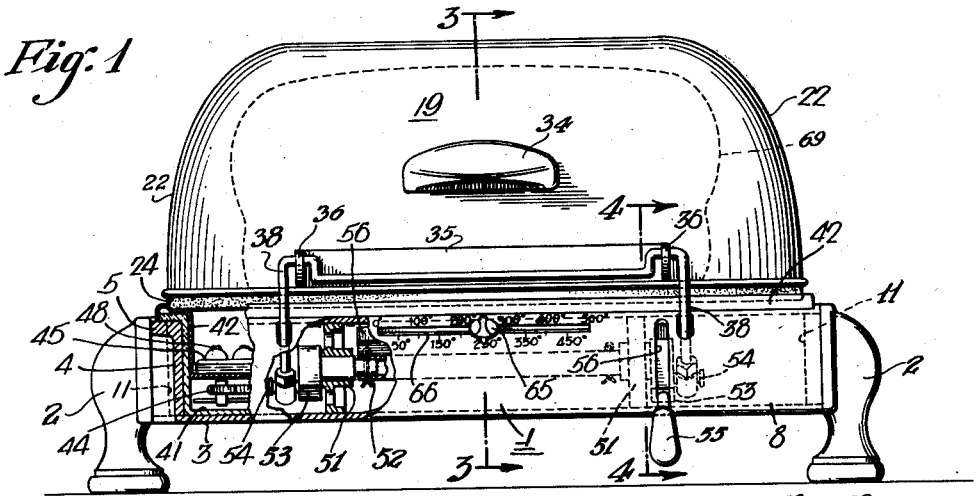
Fig. 1 is a front elevational view of an autoclave unit made in accordance with my invention.

With reference to the drawings, the apparatus therein illustrated by way of example comprises a substantially rectangular base member 1 and supporting legs 2. The base, which may, for example, be composed of molded Bakelite or other suitable plastic, takes the form of a shallow rectangular receptacle having a bottom wall 3, side walls 4—4, having outwardly extending flanges 5 at their upper edges, and front and rear walls 6 and 7 formed by integral tubular portions 8 and 9 respectively. In the present instance the legs 2 are formed separately from the base and have laterally extending cylindrical portions 11 at their upper ends which are fitted into the open ends of the cylindrical portions 8 and 9 of the base as best illustrated in Fig. 1.

Figures 2, 4:
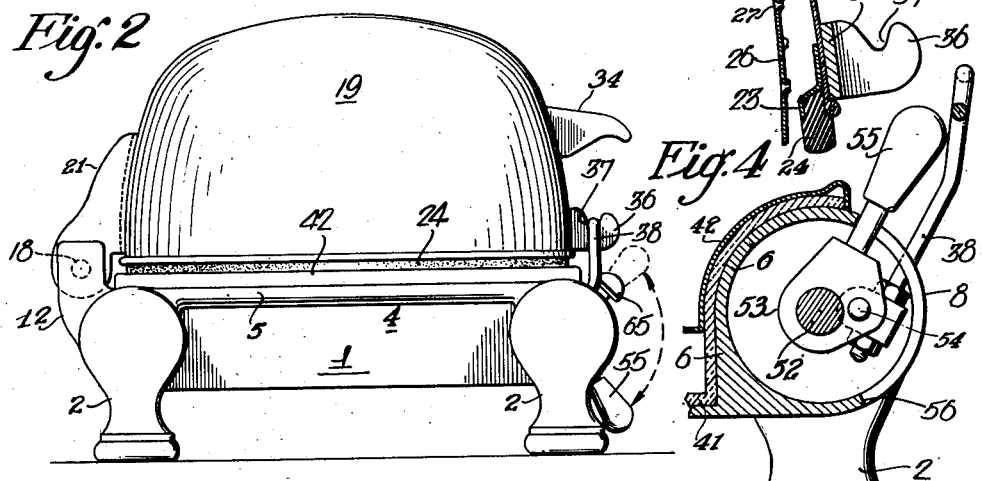
Fig. 2 is a side elevational view of the apparatus.
Fig. 4 is a sectional view on the line 4—4, Fig. 1, but showing elements of the apparatus in different positions of adjustment than in Fig. 1.

The cylindrical rear portion 9 of the base described above is provided with two rearwardly and upwardly extending ears 12, 12 each of which is provided with a vertical recess 13, and in assembly these recesses receive blocks 14, 14 each block being supported in the recess upon a spring 15 which urges the block upwardly and into engagement with the lower end of a set screw 16 threaded into a tapped hole in the top of the ear 12 and extending through said hole into the top of the recess 13. By adjustment of the screws 16 the positions of the blocks 14 in the slots may be regulated in obvious manner. Each of the blocks 14 has a transverse tapped hole 17 which receives a screw 18, said screws forming hinge pins for a dome-like cover 19 for the base 1. As shown in Figs. 2, 3 and 5 this cover 19 is provided at the back with two ears 21, 21 apertured for reception of the screws 18 whereby the cover 19 is hinged to the base.

The hood or cover 19 consists of a metallic or other dome shaped shell 22 having at its lower edge and inner side thereof a flange 23, said flange forming with the lower edge of the shell a recess for reception of a rubber or other suitable gasket 24. Spaced inwardly from the shell 22 and supported thereon by means of bosses 25 is an inner perforated shell 26. This shell being provided over its entire surface area with small apertures 27. Preferably these apertures are formed by punching the metal or other material of the shell 26 outwardly whereby the punched-out or displaced metal will project from the outer surface to form small nozzle-like flanges 28 around the outer ends of the aperture 27. At the top center, the shell 22 is recessed as indicated at 29 and is apertured in the bottom of said recess as indicated at 31. The inner shell 26 is also apertured at 32. The recess 29 and the apertures 31 and 32 are adapted to receive a weighted pressure relief or blow off valve 33, said valve normally seating in the bottom of the recess 29 to close the aperture 31 and being displaceable from its seat by excessive pressure in the interior of the receptacle, as hereinafter described, for relief of said pressure through the apertures 32 and 31.

At its front the shell 22 is provided with a handle 34 of plastic or other material relatively nonconductive of heat. The forward side of the dome 22 is also provided with a transverse member 35, the opposite ends of which project outwardly to form ears 36, and these ears have recesses 37 in their upper edges for reception of a locking bale 38 adjustably mounted in the base 1 as hereinafter described.

Seated within the base 1 and forming an inner lining for the bottom 3 and the walls 4, 6 and 7 of the base, is a rectangular basin 41 of asbestos or other suitable heat resisting material. Also supported within the base against the liner 41 is a metallic or other suitable tray 42, the bottom of this tray lying in spaced relation to and above the bottom of the liner 41 and forming a chamber 43 in the bottom of the base within which is mounted an electric heating element 44. This element lies in proximity to the bottom of the tray 42 as illustrated.

Supported in the bottom of the tray 42 is a metallic baffle 45. This baffle, which covers the entire bottom of the tray, is provided at its edges with depending flanges 46 which seat upon the tray bottom and support the body plate of the baffle 45 in the elevated position. The space between the baffle 45 and the bottom wall 42a of the tray is adapted for reception of water or other liquid medium, as indicated at 47 in Fig. 3.

With further reference to Fig. 3 it will be noted that the baffle 45 is formed with small upstanding integral domes 48 having each a small aperture 49 at its tops. These domes 48, preferably integral with the baffle plate 45, cover the entire surface of the baffle plate. When the heating element 44 is energized the water or other liquid treating agent 47 in the bottom of the tray 42 will be heated to the boiling point with formation of steam which will pass upwardly through the apertures 49 into the dome 48. As shown in Fig. 3 the gasket 24 of the dome 22 is adapted to seat upon the upper edges of the tray 42 to thereby form within the base 1 and overlying dome 22 a sealed chamber in which steam or vapor may be generated as described above.

Supported in journals 51 in the forward cylindrical portion of base 1 is a shaft 52 (see Fig. 1). Each end of this shaft is provided with an arm 53 to which is pivotally connected at 54 one end of the bale 38 previously referred to. To one of the arms 53 is connected a lever 55 which projects through a slot 56 in the wall of the cylinder 8 and which forms a handle whereby the shaft 52 may be rotated in the journals 51. When the handle 55 is moved to a depressed position as shown in Fig. 3 the bale 38 is drawn downwardly and if engaged in the recesses 37 of the ears 36 will draw the dome 19 downwardly so that the gasket 24 comes into engagement with and seats solidly upon the upper edge portion of the tray 42. The connections between the bale 38 and the arms 53 are such, as best shown in Figs. 3 and 4, as to produce a toggle which effectively locks the the arms 53 and shaft 52 in the depressed position, this resulting from the fact that the pivot points 54 are moved inwardly past a dead center relation with the axis of the shaft 52 and the point of engagement between the bale 38 and the ears 36. In this manner the dome 22 is positively locked in the closed position as shown in Fig. 3.

The adjustability of the hinge blocks 14 previously described makes possible an adjustment of the hood 19 with respect to the base such that the gasket 24 bears with uniform pressure over its entire length upon the tray 42. When the handle 55 is elevated as shown in Fig. 4 the bale 38 may be withdrawn from the locking ears 36 leaving the dome 19 free for elevation above the hinge pins 18.

Figure 6:
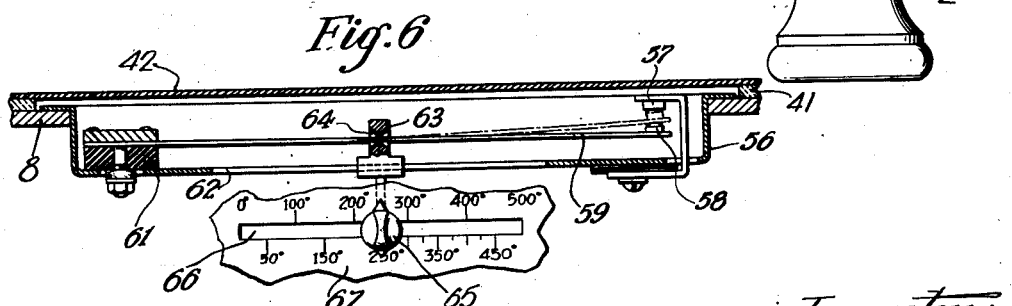
Fig. 6 is a section on the line 5—5, Fig. 3.

With reference to Figs. 3 and 6, it is to be noted that the inner wall of the cylindrical portion 8 of the base 1 is recessed for reception of a housing 56. This housing is inserted into the cylinder from the interior of the base 1 and its open side is normally covered by the forward wall of the tray 42. The housing contains a thermostatic switch controlling the flow of current to the heating element 44. The switch comprises a fixed contact point 57 (see Fig. 6) and a relatively movable contact point 58 which is carried on the end of a bimetallic strip 59. The strip 59 is anchored at the other end in an insulated block 61. The front wall of the housing 56 is slotted as indicated at 62, and supported for sliding movement in this slot is a slide 63 of insulating material, said slide having a slot 64 through which the bimetallic element 59 extends. In this arrangement the slide 63 forms in effect a fulcrum about which the free end of the bimetallic element 59 must move in approaching or withdrawing from the fixed contact element 57. Obviously the position of the slide 63 will determine the temperatures at which the contact elements 57 and 58 will come together or separate. In other words, the closer the slide 63 is moved toward the anchored end of the strip 59 the more readily will the strip flex under a changing temperature. Under these conditions, if the switch is closed, the strip will flex under a relatively low temperature to open the switch, and on the other hand, if the slide 63 is in a position in proximity to the free end of the strip, a relatively high temperature will be required to open the switch. Adjustment of the slide 63 in the slot 62 may be effected through the medium of an actuating arm 65 which extends from the slide through a slot 66 in the wall of the cylindrical portion 8 so as to be accessible from the outside of the unit. Preferably a calibrated plate is provided at the outer side of the slot 66 as indicated at 67 in Fig. 6 so as to provide for setting the slide 63 to the desired temperature. It will be apparent that with the arrangement shown the bimetallic strip 59 will be subjected through the metal wall of the tray 42 to the temperature within the autoclave chamber.

In using the aforedescribed apparatus for revitalizing stale bread, the stale product will be placed upon a wire mesh or other suitable tray 68 supported upon and above the baffle 45 (see Fig. 3). The bread is indicated by the reference numeral 69. The dome 19 is then moved downwardly and clamped in place by the bale 38 in the manner previously described, thus sealing the chamber. The control thermostat is then set through the handle 65 to a desired temperature, say in this case 250°, and the circuit is then closed through the heating element 44. The water 47 within the tray 42 will rapidly be brought to boiling temperature and generated steam will pass upwardly through the holes 49 into the dome 19. Pressure within the dome will increase to a point affording the desired temperature at which time the heat will cause the thermostat switch 57—58, previously closed, to open. As the pressure and temperature drop the thermostat will act automatically to again close the switch so that a substantially uniform pressure and temperature is maintained in the treating chamber.

The domes 48 of the baffle 45 constitute a means for excluding liquid from the treating chamber and for preventing the water or other treating medium in its liquid phase from coming into contact with the bread. Liquid projected upward from the boiling body of liquid in the tray will not pass through the small apertures 49, but coming into contact with the surfaces of the domes 48, will flow back into the pan. Thus the treating medium will be excluded from the treating chamber except in the vapor phase which will pass freely through the small apertures 49. The steam coming into contact with the inner shell 26 will rapidly bring this shell to the chamber temperature and will readily maintain the shell 26 at the elevated temperature by reason of the insulating space between this inner shell and the outer shell 22. Thus there will be a minimum condensation of moisture upon the inner surface of the shell 26.

The steam or vapor phase medium will pass freely through the small apertures 27 and, coming into contact with the relatively cool outer shell 22 will condense upon the inner surface of that shell and will flow by gravity down the surface of this shell to the tray 42. Liquid phase medium dropping onto the outer surface of the inner shell 26 will be prevented from passing back through the small apertures 27 by the projections 28 and will flow down the outer surface of the shell 27 to the tray 42. In this manner water or other treating liquid is prevented from contacting the bread or other material under treatment. The steam or other vapor under the elevated pressure will penetrate the bread and will restore to it the normal moisture content.

After an adequate period of treatment the flow current to the heating element 44 is interrupted, the bale 38 released, and the revitalized product removed from the autoclave.

In the event of development of excessive pressure within the treating chamber the valve 31 will automatically open in well known manner to relieve the pressure.

I claim:

1. In a device of the character described, a base structure, casing means detachably mounted in the base and forming the bottom of a work chamber, and a cover for said casing, arranged and, when closed to seat upon the casing to form the upper part of and to close said work chamber, and a hinge structure connecting the cover to the base and including a pair of blocks slidably mounted in vertical guideways at opposite sides respectively of the base, hinge pins connecting the cover to the blocks, springs tending to elevate the blocks in the said guideways, and screws threaded in the base and bearing upon the tops of the blocks for regulating the positions of the blocks vertically in the guideways.

2. A device, according to claim 1, wherein means is provided on the base for releasably positively clamping the cover to its seat.

3. In a device of the character described, an open top base structure, two opposite side walls of said structure being formed as hollow cylinders, casing means detachably mounted in the base and forming the bottom of a work chamber, said casing means forming a receptacle for water, electric heating elements supported on the base in thermal transfer relation to the water containing part of said casing for converting said water into steam, adjustable thermostatic control devices for said steam generating means housed in one of said cylindrical walls of the base structure, a detachable cover for said casing enclosing the work chamber, and latching means for the cover also housed in the cylindrical wall last named.

4. In a device of the character described, a base structure, casing means detachably mounted in the base and forming the bottom of a work chamber, said casing means forming a receptacle for water, electric heating elements supported on the base in thermal transfer relation to the water-containing part of said casing for converting said water into steam, a foraminous baffle in the casing having a horizontal foraminous area overlying the entire water-containing portion of the casing and forming a bottom wall for the work chamber, said baffle being formed with upstanding hollow projections each having an aperture at the top for passage of the steam to the chamber, means for supporting work material in an elevated position above the said foraminous area of the baffle, a cover for said casing arranged when closed to seat upon the casing to form the upper part of and to close said work chamber, and a hinge structure connecting the cover to the base and including a pair of blocks slidably mounted in vertical guideways at opposite sides respectively of the base, hinge pins connecting the cover to the blocks, springs tending to elevate the blocks in the said guideways, and screws threaded in the base and bearing upon the tops of the blocks for regulating the positions of the blocks vertically in the guideways.

THEODORE G. HUTCHENS.

REFERENCES CITED

The following references are of record in the file of this patent:

UNITED STATES PATENTS

| Number | Name | Date |
| --- | --- | --- |
| 365,915 | Fowble | July 5, 1887 |
| 1,178,301 | Curran | Apr. 4, 1916 |
| 1,401,734 | Roberts | Dec. 27, 1921 |
| 1,756,787 | Goughnour | Apr. 29, 1930 |
| 2,081,537 | Hanks | May 25, 1937 |
| 2,102,342 | Walder | Dec. 14, 1937 |
| 2,441,221 | Eckel | May 11, 1948 |
| 2,518,566 | Osterheld | Aug. 15, 1950 |

FOREIGN PATENTS

| Number | Country | Date |
| --- | --- | --- |
| 514,306 | Great Britain | Nov. 6, 1939 |